(12) United States Patent
Takashiba

(10) Patent No.: US 11,773,756 B2
(45) Date of Patent: Oct. 3, 2023

(54) VARIABLE VALVE TIMING SYSTEM

(71) Applicant: SUZUKI MOTOR CORPORATION, Hamamatsu (JP)

(72) Inventor: Yasuto Takashiba, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/157,412

(22) Filed: Jan. 20, 2023

(65) Prior Publication Data

US 2023/0250741 A1    Aug. 10, 2023

(30) Foreign Application Priority Data

Feb. 10, 2022  (JP) .................. 2022-019255

(51) Int. Cl.
*F01L 1/344*    (2006.01)
*F01L 13/00*    (2006.01)

(52) U.S. Cl.
CPC ..... *F01L 1/3442* (2013.01); *F01L 2001/3443* (2013.01); *F01L 2001/34423* (2013.01); *F01L 2001/34426* (2013.01); *F01L 2013/115* (2013.01); *F01L 2820/043* (2013.01)

(58) Field of Classification Search
CPC ........... F01L 1/3442; F01L 2001/34423; F01L 2001/3443; F01L 2013/115; F01L 2820/043

USPC ....................................................... 123/90.15
See application file for complete search history.

(56) References Cited

U.S. PATENT DOCUMENTS

| | | | |
|---|---|---|---|
| 2006/0157010 A1* | 7/2006 | Moriwaki | F01L 9/10 |
| | | | 123/90.15 |
| 2010/0300795 A1 | 12/2010 | Adachi et al. | 180/291 |
| 2018/0313236 A1* | 11/2018 | Ozeki | F01L 1/3442 |

FOREIGN PATENT DOCUMENTS

JP    5345448 B2    8/2013

* cited by examiner

*Primary Examiner* — Jorge L Leon, Jr.
(74) *Attorney, Agent, or Firm* — Stein IP, LLC

(57) ABSTRACT

There is provided a variable valve timing system including: a variable valve device; an oil control valve configured to control a hydraulic pressure with respect to the variable valve device; an external pipe connecting a main gallery and the oil control valve; and a hydraulic pressure sensor configured to detect a hydraulic pressure in an oil path formed at the crankcase. The oil control valve is disposed on one side surface of the engine in the vehicle width direction. One end portion of the external pipe is connected to one side of the main gallery in the vehicle width direction. In a bottom view of a vehicle, the one end portion of the external pipe overlaps with the crankcase, and the hydraulic pressure sensor overlaps with the crankcase on one side of the one end portion of the external pipe in the vehicle width direction.

6 Claims, 11 Drawing Sheets

VARIABLE VALVE TIMING SYSTEM

CROSS-REFERENCE TO RELATED APPLICATIONS

This application is based on Japanese Patent Application No. 2022-019255 filed on Feb. 10, 2022, the contents of which are incorporated herein by way of reference.

TECHNICAL FIELD

The present invention relates to a variable valve timing system.

BACKGROUND

For an object of high output, low fuel consumption, and low exhaust gas, a variable valve timing system is employed, which controls an opening and closing timing of a valve by a variable valve device according to an operation state of an engine. As a variable valve timing system, there is a system in which an oil control valve disposed on an outer surface of a cylinder head controls a hydraulic pressure with respect to a variable valve device (see, for example, Patent Literature 1). A hydraulic pressure sensor is attached in a middle of an oil path from an oil supply source to the oil control valve, and detects a hydraulic pressure of oil supplied from the oil control valve to the variable valve device.
Patent Literature 1: JP5345448B It is preferable to form the oil path from the oil supply source to the oil control valve in a crankcase, but a problem that the crankcase is large is present. In a straddle-type vehicle, a vehicle body frame limits a size of an engine, and thus an external pipe is sometimes used to supply the oil to the oil control valve. The hydraulic pressure sensor is provided near the external pipe to operate the variable valve device with high accuracy, but a bank angle and damage at the time of overturning have not been sufficiently studied.

The present invention has been made in view of such a point, and an object thereof is to provide a variable valve timing system that improves an operation accuracy of a variable valve device and enables proper disposing of an external pipe and a hydraulic pressure sensor.

SUMMARY

There is provided a variable valve timing system for an engine in which a main gallery extending in a vehicle width direction is formed at a crankcase, the variable valve timing system including: a variable valve device configured to change an opening and closing timing of a valve according to a hydraulic pressure; an oil control valve configured to control a hydraulic pressure with respect to the variable valve device; an external pipe connecting the main gallery and the oil control valve; and a hydraulic pressure sensor configured to detect a hydraulic pressure in an oil path formed at the crankcase. The oil control valve is disposed on one side surface of the engine in the vehicle width direction. One end portion of the external pipe is connected to one side of the main gallery in the vehicle width direction. In a bottom view of a vehicle, the one end portion of the external pipe overlaps with the crankcase, and the hydraulic pressure sensor overlaps with the crankcase on one side of the one end portion of the external pipe in the vehicle width direction.

DESCRIPTION OF EMBODIMENTS

A variable valve timing system according to an aspect of the present invention is mounted on an engine in which a main gallery long in a vehicle width direction is formed at a crankcase. The variable valve timing system is provided with a variable valve device configured to change an opening and closing timing of a valve according to a hydraulic pressure, and an oil control valve configured to control a hydraulic pressure with respect to the variable valve device. The main gallery and the oil control valve are connected by an external pipe, and oil with high hydraulic pressure is supplied directly from the main gallery to the oil control valve through the external pipe. The hydraulic pressure in the oil path formed at the crankcase is detected by a hydraulic pressure sensor, and the hydraulic pressure near the external pipe is detected by the hydraulic pressure sensor, so that an operation accuracy of the variable valve device can be improved. The oil control valve is disposed on one side surface of the engine in the vehicle width direction, and one end portion of the external pipe is connected to one side of the main gallery in the vehicle width direction. In a bottom view of a vehicle, the one end portion of the external pipe overlaps with the crankcase, and the hydraulic pressure sensor overlaps with the crankcase on one side in the vehicle width direction of the one end portion of the external pipe, so that the external pipe and the hydraulic pressure sensor can be disposed at proper positions with consideration for a bank angle and damage at the time of overturning. By bringing the hydraulic pressure sensor close to the one side in the vehicle width direction, heat damage to the hydraulic pressure sensor caused by the engine can be suppressed, access to the hydraulic pressure sensor is facilitated, and maintainability is improved.

Embodiment

Figure 1:
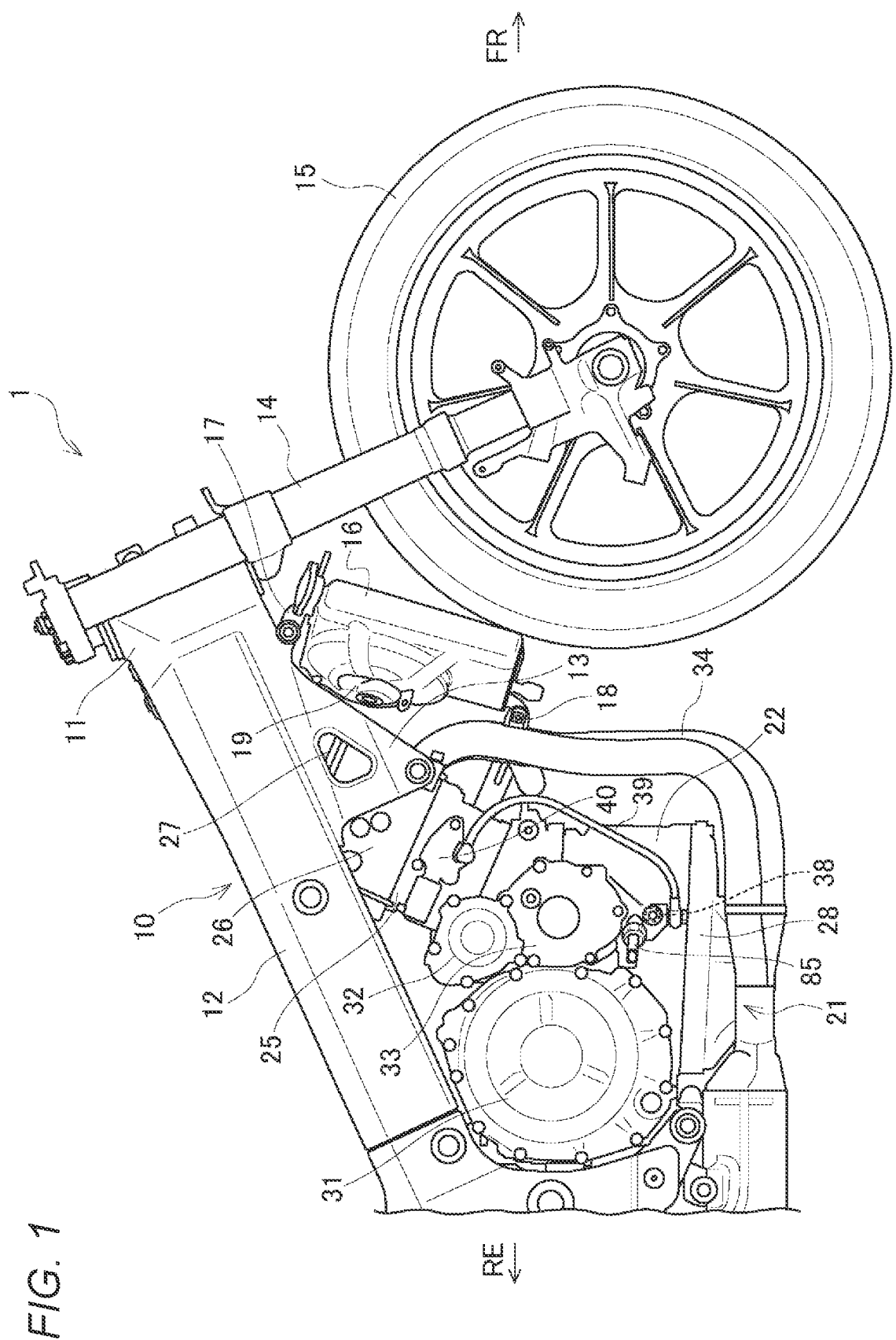
FIG. 1 is a right side view of a vehicle front portion according to the present embodiment.

Hereinafter, the present embodiment will be described in detail with reference to the accompanying drawings. FIG. 1 is a right side view of a vehicle front portion according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 includes various components such as an engine 21 and an electrical system that are mounted on a twin spar-type vehicle body frame 10. The vehicle body frame 10 includes a pair of main frames 12 that are branched off from a head pipe 11 to the left and right and extend rearward, and a pair of down frames 13 that extend downward from front portions of the pair of main frames 12. The pair of main frames 12 are curved so as to pass over the engine 21 and wrap around to the rear of the engine 21. An upper side and a rear side of the engine 21 are suspended by the pair of main frames 12, and a front side of the engine 21 is suspended by the pair of down frames 13.

A front fork 14 is steerably supported by the head pipe 11 via a steering shaft (not shown). A front wheel 15 is rotatably supported at a lower portion of the front fork 14. A radiator (heat exchanger) 16 that dissipates heat from cooling water of the engine 21 is provided in front of the engine 21. An upper portion of the radiator 16 is supported by the main frames 12 via an upper bracket 17, and a lower portion of the radiator 16 is supported by the engine 21 via a lower bracket 18. A cooling fan 19 that takes in hot air from the radiator 16 when the vehicle is stopped is attached to a rear surface of the radiator 16.

The engine 21 is a parallel 4-cylinder engine in which four cylinders are arranged in left and right directions, and includes a crankcase 22 accommodating a crankshaft (not shown). A cylinder assembly in which a cylinder 25, a cylinder head 26, and a cylinder head cover 27 are laminated is attached to an upper portion of the crankcase 22. An oil pan 28 in which oil for lubrication and cooling is stored is attached to a lower portion of the crankcase 22. Engine covers such as a clutch cover 31 and starter gear covers 32 and 33 are attached to a left side surface of the crankcase 22. A plurality of exhaust pipes 34 extend downward from a front surface of the engine 21.

The engine 21 is mounted with a hydraulically controlled variable valve timing system that controls an opening and closing timing of an intake valve (not shown). A variable valve device 60 (see FIG. 9) is accommodated inside the cylinder head 26 and the cylinder head cover 27, and an oil control valve 40 is disposed on an outer surface of the cylinder 25. The variable valve device 60 and the oil control valve 40 are connected through various oil paths in the engine 21. The oil control valve 40 controls a hydraulic pressure with respect to the variable valve device 60, so that the opening and closing timing of the intake valve is changed according to the hydraulic pressure with respect to the variable valve device 60.

In such an engine 21, the oil is supplied to the oil control valve 40 from a main gallery 38 of the crankcase 22 through an external pipe 39. In this case, when disposing the external pipe 39, a bank angle, a ride height, damage at the time of overturning, and the like, are considered. In order to control a variable valve timing, it is preferable to detect a hydraulic pressure in the external pipe 39, but the bank angle and the like are taken into consideration regarding a disposing position of a hydraulic pressure sensor 85. Furthermore, an oil pressure switch is provided in order to monitor a hydraulic pressure of each part of the engine 21.

Therefore, in the variable valve timing system according to the present embodiment, a dead space formed in the lower portion of the crankcase 22 is used to dispose the external pipe 39 and the hydraulic pressure sensor 85. The hydraulic pressure sensor 85 detects a hydraulic pressure of the oil path inside the crankcase 22 near an inlet of the external pipe 39. Accordingly, not only is the hydraulic pressure in the external pipe 39 monitored to control the variable valve timing, but the hydraulic pressure inside the engine 21 is also monitored to supply the oil for lubrication to each part of the engine 21, and a need to separately provide an oil pressure switch is eliminated. By disposing the hydraulic pressure sensor 85 close to the one side in the vehicle width direction, the maintainability is improved.

Figure 2:
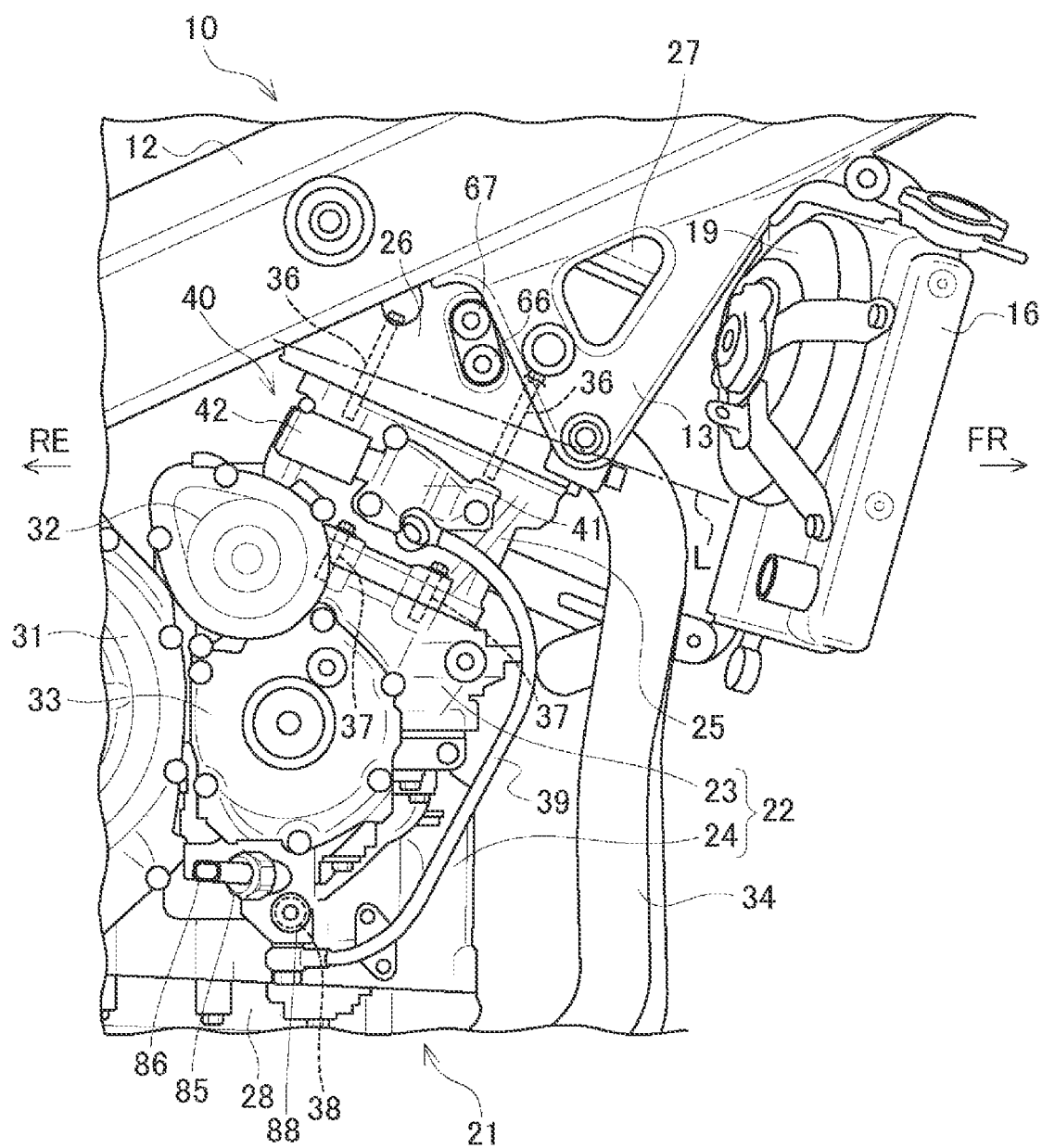
FIG. 2 is a right side view of the periphery of an engine according to the present embodiment.
Figure 3:
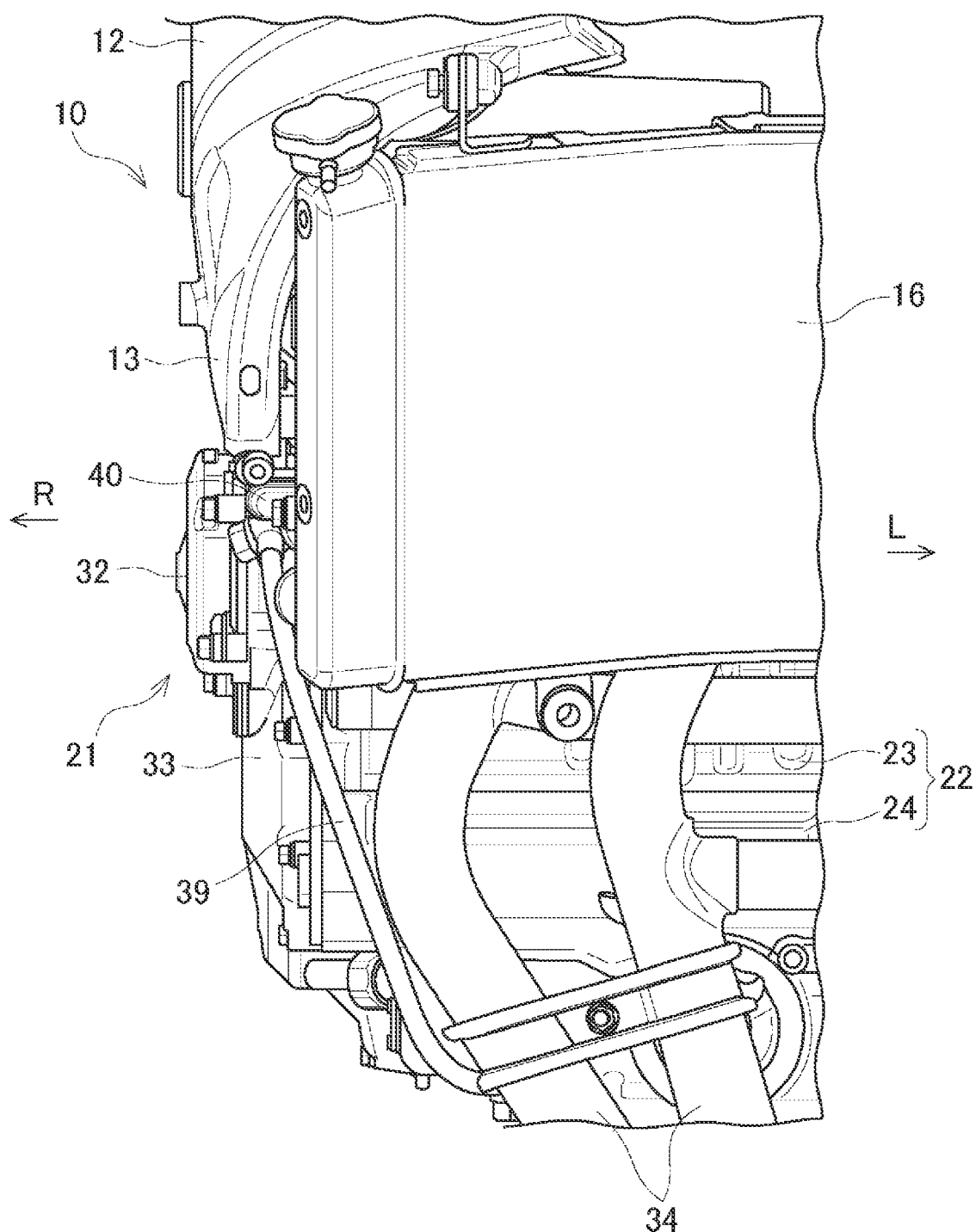
FIG. 3 is a front view of the periphery of the engine according to the present embodiment.

A layout of the oil control valve will be described with reference to FIG. 2 and FIG. 3. FIG. 2 is a right side view of the periphery of the engine according to the present embodiment. FIG. 3 is a front view of the periphery of the engine according to the present embodiment.

As shown in FIG. 2, the crankcase 22 of the engine 21 has a vertically divided structure including an upper case 23 and a lower case 24. Various shafts such as a crankshaft are supported by a mating surface between the upper case 23 and the lower case 24. The oil pan 28 is fixed to a lower surface of the lower case 24 and the cylinder 25 is fixed to an upper surface of the upper case 23. The cylinder head 26 is fixed to an upper surface of the cylinder 25, and the cylinder head cover 27 is fixed to an upper surface of the cylinder head 26. The cylinder head 26 and the crankcase 22 are suspended on the vehicle body frame 10.

A front portion of the vehicle body frame 10 branches into the main frames 12 and the down frames 13. The main frame 12 obliquely crosses a side of the cylinder head 26 from the upper surface to a rear surface, and the down frame 13 is formed in a substantially triangular shape in a side view such that a front-to-rear width narrows downward. The main frame 12 laterally covers a rear side of the cylinder head 26, and the down frame 13 laterally covers a front side of the cylinder head 26. The rear side of the cylinder head 26 is suspended on a middle portion of the main frame 12 in an extension direction, and the front side of the cylinder head 26 is suspended on a lower head portion of the down frame 13.

A triangular area (area) surrounded by a lower edge of the main frame 12, a rear edge of the down frame 13, and a lower surface of the cylinder head 26 is formed on a side surface of the cylinder head 26 in a side view of the vehicle. Although the triangular area of the cylinder head 26 is exposed to the side from between the main frame 12 and the down frame 13, the triangular area is not wide enough for the oil control valve 40. Therefore, the oil control valve 40 is disposed on a right side surface (outer surface) of the cylinder 25 below the triangular area of the cylinder head 26. The side surface of the cylinder 25 is formed by an outer wall of a cam chain chamber 58 (see FIG. 6).

A pair of plug caps 66 and 67 that close insertion openings for a pair of oil pipes 64 and 65 (see FIG. 5) which will be described later are disposed in the triangular area of the cylinder head 26. Since the plug caps 66 and 67 avoid the vehicle body frame 10 in the side view of the vehicle, the oil pipes 64 and 65 can be attached and detached through the plug caps 66 and 67 even when the engine 21 is suspended on the vehicle body frame 10, and the maintainability is improved. Since the plug caps 66 and 67 are disposed along the rear edge of the down frame 13, there is no need to modify a shape of the down frame 13. In this case, the plug cap 67 at the vehicle rear side is positioned higher than the plug cap 66 at the vehicle front side, and the plug caps 66 and 67 are partially overlapped with each other in an up-down direction, so that a disposing area of the plug caps 66 and 67 is narrowed.

The oil control valve 40 is formed in a substantially cylindrical shape by a valve housing 41 in which a valve spool (not shown) is accommodated and a solenoid 42 that advances and retracts the valve spool. The oil path in the oil control valve 40 is switched by advancing and retracting the valve spool by the solenoid 42. The oil control valve 40 is tilted such that an axial direction of the oil control valve 40 is parallel to a mating surface between the cylinder head 26 and the cylinder 25. The solenoid 42 is provided on a rear side of the valve housing 41 and positioned above the valve housing 41.

A contamination such as metal powder may occur inside the valve housing 41, but it is difficult for the contamination to enter the solenoid 42 from the valve housing 41. That is, since the oil control valve 40 is tilted such that the solenoid 42 is located higher than the valve housing 41, the contamination is suppressed from being transferred from the valve housing 41 to the solenoid 42 by the oil. Since the contamination does not accumulate on a solenoid 42 side, damage to the oil control valve 40 due to the contamination is suppressed. Details of the oil control valve 40 will be described later.

Since the oil control valve 40 is disposed on the outer surface of the cylinder 25, the oil control valve 40 does not interfere with the vehicle body frame 10 on which the cylinder head 26 is suspended. Therefore, the vehicle body frame 10 does not protrude outward in the vehicle width direction, and an increase in a size of the straddle-type vehicle 1 is suppressed. Since the center of gravity of the engine 21 is located in the crankcase 22, the oil control valve is brought close to the center of gravity of the engine 21. Therefore, transmission of vibration from the crankcase 22 to the oil control valve 40 is reduced, and the durability of the oil control valve 40 is improved.

In the side view of the vehicle, the cylinder head 26 and the cylinder 25 are fixed by two bolts 36 on both sides of a cylinder axis, and the cylinder 25 and the crankcase 22 are fixed by two bolts 37 on the both sides of the cylinder axis. The oil control valve 40 is disposed so as not to overlap with these four bolts 36 and 37, and the oil control valve 40 is suppressed from protruding outward in the vehicle width direction. In this case, an interval between the two bolts 36 on an upper side is wider than an interval between the two bolts 37 on a lower side, and the oil control valve 40 is positioned close to the cylinder head 26.

The starter gear covers 32 and 33 that laterally cover starter gears (not shown) are provided below the oil control valve 40. The clutch cover 31 that laterally covers a clutch (not shown) is provided behind the starter gear covers 32 and 33. An upper portion of the starter gear cover 32 protrudes toward the cylinder 25, but interference between the starter gear cover 33 and the solenoid 42 is suppressed. The starter gear covers 32 and 33 and the clutch cover 31 are formed as separate engine covers, but the starter gear covers 32 and 33 and the clutch cover 31 may be formed as one engine cover.

As shown in FIGS. 2 and 3, the starter gear covers 32 and 33 and the clutch cover 31 bulge outward from the side surface of the cylinder 25 in the vehicle width direction. In a front view of the vehicle, the oil control valve 40 is positioned inside the starter gear covers 32 and 33, the clutch cover 31, and the down frames 13 in the vehicle width direction. The oil control valve 40 is positioned between the starter gear covers 32 and 33 and the down frames 13. The oil control valve 40 is protected by the starter gear covers 32 and 33, the clutch cover 31, and the down frames 13 when the vehicle overturns.

The main gallery 38 that is long in the vehicle width direction is formed in the lower portion of the crankcase 22. The main gallery 38 supplies the oil from an oil pump (not shown) to each part of the engine 21 such as a journal bearing (not shown) of a crankshaft. The main gallery 38 and the oil control valve 40 are connected by the external pipe 39. One end portion (lower end portion) of the external pipe 39 is connected to a right side (one side in the vehicle width direction) of the main gallery 38, and the other end portion (upper end portion) of the external pipe 39 is connected to the oil control valve 40 disposed on a right side surface of the engine 21 (cylinder 25).

Since oil for valve timing control requires a high hydraulic pressure, the oil is directly supplied from the main gallery 38 to the oil control valve 40 through the external pipe 39. The oil is fed from the main gallery 38 to the oil control valve 40 without passing through the oil path in the crankcase 22 from the main gallery 38. Accordingly, a pressure loss in the oil path is reduced, and the oil with high hydraulic pressure is supplied to the oil control valve 40. The external pipe 39 may include a pipe, or may include a pipe and a tube.

In the side view of the vehicle, the one end portion of the external pipe 39 is fixed to the lower portion of the crankcase 22 via a union bolt (see FIG. 2). The external pipe 39 extends from the main gallery 38 to the vehicle front side, wraps around the crankcase 22 from the lower side behind each exhaust pipe 34 and extends upward, and is bent toward the vehicle rear side below the down frame 13. The other end portion of the external pipe 39 is fixed to the oil control valve 40 via a union bolt. In this way, the external pipe 39 is positioned below the down frame 13 on a right side of the engine 21. Since the external pipe 39 is shortened, a pressure loss is reduced and an operation accuracy of the variable valve device 60 is improved, and it is easy to correspond to a bank angle and the like.

In the front view of the vehicle, the engine covers such as the starter gear covers 32 and 33 and the clutch cover 31 are attached to a right side surface of the crankcase 22 (see FIG. 3). The exhaust pipe 34 extends downward from a front surface of the cylinder head 26 above the crankcase 22, and the one end portion (lower end portion) of the external pipe 39 is covered with the exhaust pipe 34 from a front side. The external pipe 39 protrudes to a right side (one side in the vehicle width direction) from a back side of the exhaust pipe 34, and the external pipe 39 extends toward the oil control valve 40 through between various engine covers and the exhaust pipe 34.

Since the external pipe 39 is located inside the various engine covers in the vehicle width direction, the external pipe 39 is protected by the various engine covers and the down frames 13 when the vehicle overturns. Although the one end portion of the external pipe 39 is close to a road surface, the one end portion of the external pipe 39 is protected by the exhaust pipe 34. Further, the external pipe 39 is separated from the exhaust pipe 34 without protruding to the right side from the various engine covers. Since an influence of a heat from the exhaust pipe 34 on the external pipe 39 is suppressed, and the external pipe 39 is cooled by running wind, an increase in an oil temperature inside the external pipe 39 can be suppressed.

The hydraulic pressure sensor 85 is detachably disposed on an outer surface of the crankcase 22. The hydraulic pressure sensor 85 detects the hydraulic pressure of the oil path formed in the crankcase 22. The hydraulic pressure sensor 85 not only detects a hydraulic pressure near the one end portion of the external pipe 39 to monitor the hydraulic pressure in the external pipe 39 in order to control a variable valve timing, but also monitors the hydraulic pressure in the engine 21 in order to supply the oil for lubrication to each part of the engine 21. Since the hydraulic pressure sensor 85 is located inside the various engine covers in the vehicle width direction, the hydraulic pressure sensor 85 is protected by the various engine covers and the down frames 13 when the vehicle overturns.

The radiator 16 having a rectangular shape in the front view is provided in front of the cylinder head 26. The radiator 16 is tilted such that the upper portion is located forward of the lower portion. The radiator 16 is a round radiator curved into an arch shape in a top view, and the cooling fan 19 is attached to the rear surface of the radiator 16 on an oil control valve 40 side (right side) in the vehicle width direction. In the front view of the vehicle, the oil control valve 40 is disposed outside the radiator 16 in the vehicle width direction and below the down frames 13, and it is difficult for the radiator 16 and the down frames 13 to block the running wind in front of the oil control valve 40.

Since the oil control valve 40 is a solenoid valve, the oil control valve 40 is likely to generate heat when the solenoid 42 is energized. Therefore, the oil control valve 40 is cooled by the running wind, so that deterioration of operability of the variable valve device 60 due to temperature rise of the oil control valve 40 and the oil is suppressed. As described above, the solenoid 42 is positioned at the rear side of the valve housing 41, and the solenoid 42 is separated from the radiator 16. The heat from the radiator 16 is less likely to be transmitted to the solenoid 42, and temperature rise of the solenoid 42 is suppressed.

In the side view of the vehicle, a lower end of the down frame 13 is positioned on an extension line L extending from a lower end of the cooling fan 19 in a blowing direction, and the oil control valve 40 is positioned below the extension line L. Exhaust air from the radiator 16 is less likely to hit the oil control valve 40, and the deterioration of the operability of the variable valve device 60 due to the temperature rise of the oil control valve 40 and the oil is suppressed. In the front view of the vehicle, the solenoid 42 of the oil control valve 40 is covered by the down frames 13, and the exhaust air from the radiator 16 is blocked by the down frames 13 to suppress the temperature rise of the solenoid 42.

Figure 4A:
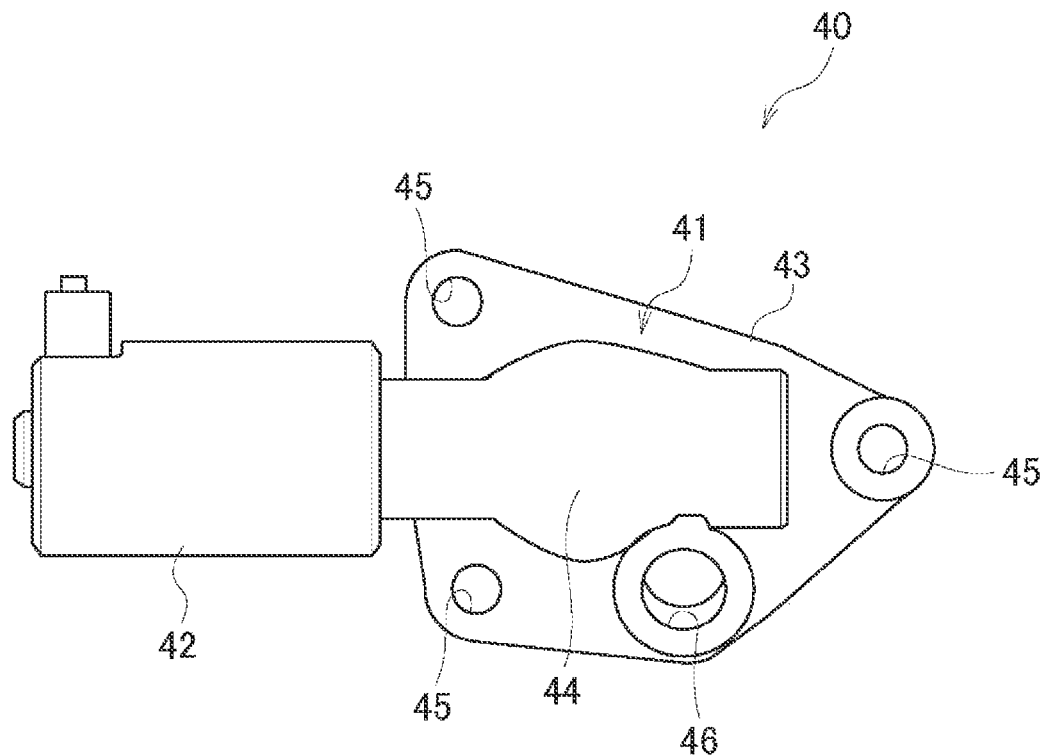
FIG. 4A and FIG. 4B are front and rear views of an oil control valve according to the present embodiment.
Figure 4B:
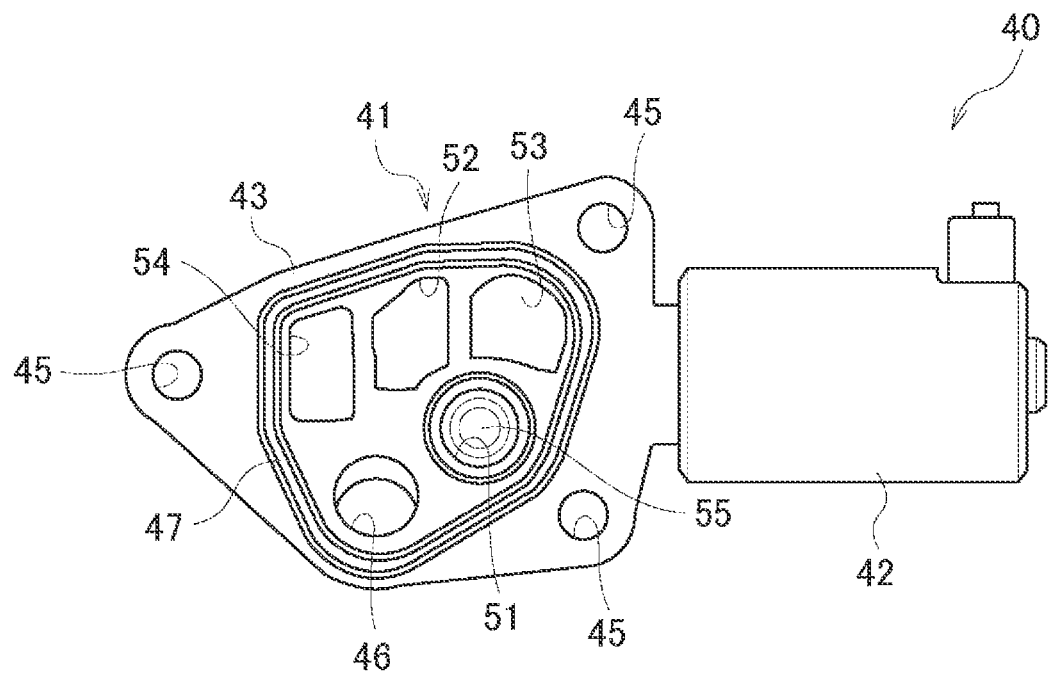

The oil control valve will be described with reference to FIG. 4A and FIG. 4B. FIG. 4A and FIG. 4B are front and rear views of the oil control valve according to the present embodiment. FIG. 4A shows the front view of the oil control valve, and FIG. 4B shows the rear view of the oil control valve.

As shown in FIG. 4A and FIG. 4B, the valve housing 41 of the oil control valve 40 includes a disposing plate 43 disposed on the side surface of the cylinder 25, and a cylindrical case 44 bulging outward from the disposing plate 43. Three fixing holes 45 for screwing are formed in an outer edge of the disposing plate 43 so as to surround the cylindrical case 44. A supply port 46 to which the external pipe 39 (see FIG. 2) is connected is formed in a lower portion of the disposing plate 43. The valve spool extending from the solenoid 42 is inserted into the cylindrical case 44. A destination of the oil entering from the supply port 46 is switched by the valve spool.

An O-ring 47 that seals a gap between a rear surface of the disposing plate 43 and the side surface of the cylinder 25 is attached to the rear surface of the disposing plate 43. The supply port 46, an input port 51, an advance port 52, a retard port 53, and a drain port 54 are formed inside the O-ring 47. The supply port 46 communicates with the input port 51 through the oil path formed in the cylinder 25. A filter 55 is disposed in the input port 51, and the oil is filtered by passing through the filter 55. The input port 51 communicates with any one of the advance port 52, the retard port 53, and the drain port 54 depending on a position of the valve spool.

When the oil enters the input port 51 from the supply port 46, the oil filtered by the filter 55 of the input port 51 is input to the cylindrical case 44. By moving the valve spool by the solenoid 42, the input port 51 is communicated with either the advance port 52 or the retard port 53, and the drain port 54 is communicated with the other of the advance port 52 and the retard port 53. Accordingly, the oil is supplied from the oil control valve 40 toward either an advance chamber S1 or a retard chamber S2 of the variable valve device 60 (see FIG. 9) which will be described later, and the excess oil is discharged toward the oil control valve 40 from the other of the advance chamber S1 and the retard chamber S2.

Figure 5:
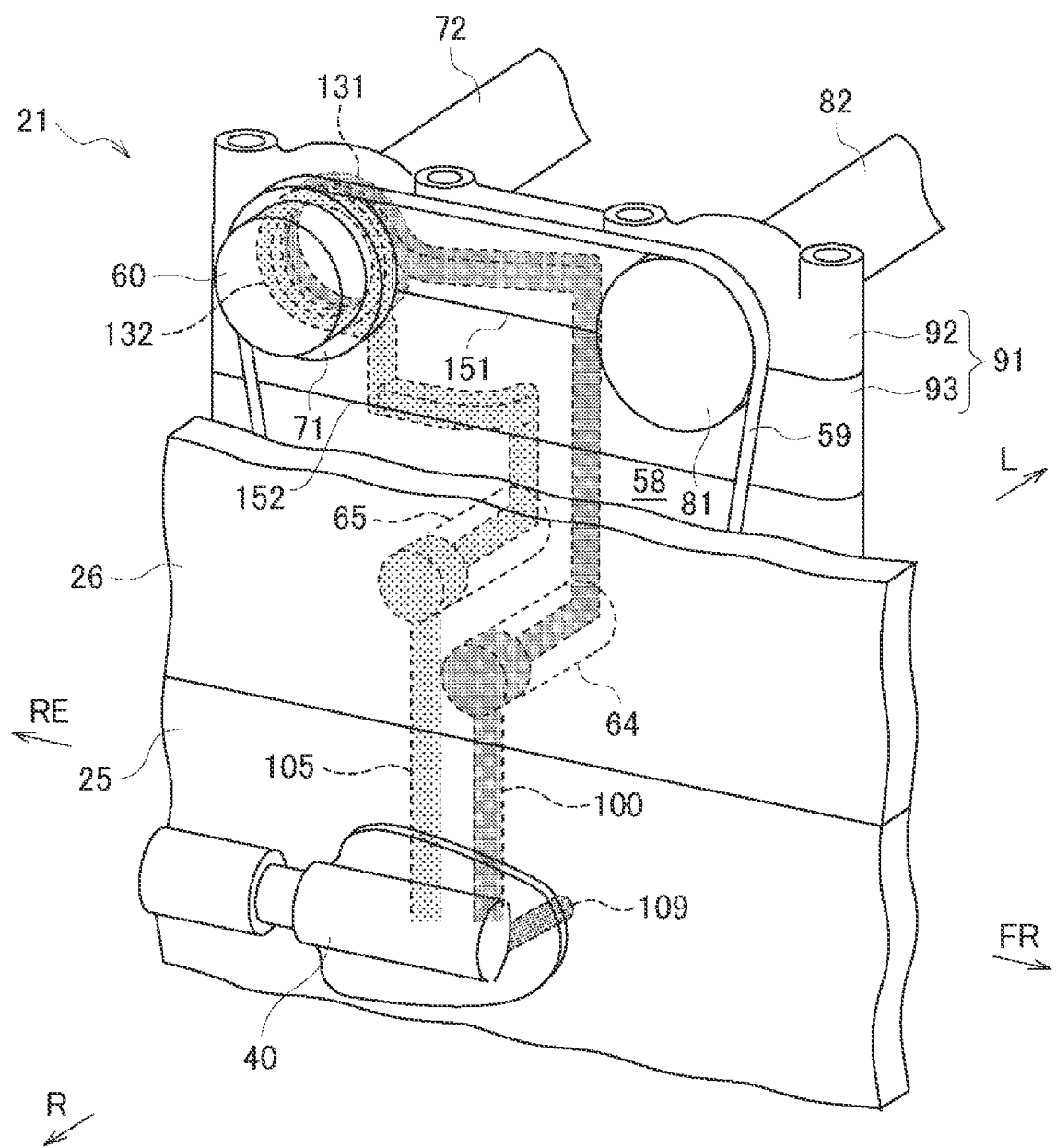
FIG. 5 is a schematic view of an oil path according to the present embodiment.

The oil path in the engine will be described with reference to FIG. 5. FIG. 5 is a schematic view of the oil path according to the present embodiment.

As shown in FIG. 5, the cam chain chamber 58 is formed in the cylinder 25 and cylinder head 26 of the engine 21. A cam chain 59 is accommodated in the cam chain chamber 58, and the cam chain 59 is stretched over an intake side cam sprocket 71 and an exhaust side cam sprocket 81. An intake side camshaft 72 is fixed to the intake side cam sprocket 71, and an exhaust side camshaft 82 is fixed to the exhaust side cam sprocket 81. The crankshaft (not shown) is connected to the intake side camshaft 72 and the exhaust side camshaft 82 via the cam chain 59.

The intake side camshaft 72 and the exhaust side camshaft 82 are rotatably supported by a cam housing 91. The cam housing 91 is a support wall fixed on the cylinder head 26, and includes an upper housing 92 that supports upper half portions of the camshafts 72 and 82 and a lower housing 93 that supports lower half portions of the camshafts 72 and 82. The variable valve device 60 is attached to one end portion of the intake side camshaft 72 inside the cylinder head 26. The variable valve device 60 advances or retards the intake side camshaft 72 according to the hydraulic pressure to change the opening and closing timing of the intake valve (not shown).

The oil control valve 40 is disposed on the outer surface (side surface) of the cylinder which is the outer wall of the cam chain chamber 58. The oil control valve 40 controls the hydraulic pressure with respect to the variable valve device 60. An advance path 100 extends from the advance port 52 (see FIG. 4B) of the oil control valve 40 toward the variable valve device 60, and a retard path 105 extends from the retard port 53 (see FIG. 4B) of the oil control valve 40 toward the variable valve device 60. The oil for advancing the opening and closing timing of the intake valve passes through the advance path 100, and the oil for retarding the opening and closing timing of the intake valve passes through the retard path 105.

The advance path 100 and the retard path 105 for the hydraulic pressure control enter the outer wall of the cam chain chamber 58 from the oil control valve 40. The advance path 100 and the retard path 105 are oriented from a cylinder 25 side to a cylinder head 26 side, then cross the cam chain chamber 58 toward the variable valve device 60 through an inner wall of the cam chain chamber 58. In this case, the outer wall of the cam chain chamber 58 is formed by an outer wall of the cylinder 25, an outer wall of the cylinder head 26, and an outer wall of the crankcase 22, and the inner wall of the cam chain chamber 58 is formed by an inner wall of the cylinder 25, an inner wall of the cylinder head 26, an inner wall of the crankcase 22, and the cam housing 91.

The outer wall and the inner wall of the cylinder head 26 are connected by the pair of oil pipes 64 and 65. The pair of oil pipes 64 and 65 cross the cam chain chamber 58 through the inside of the cam chain 59. Since the oil pipes 64 and 65 are detachably disposed, the pair of oil pipes 64 and 65 do not interfere when the cam chain 59 is assembled. Since the oil pipes 64 and 65 are detachable, the pair of oil pipes 64 and 65 can be inserted after the cam chain 59 is assembled to the engine 21. Accordingly, a dead space inside the cam chain 59 can be effectively utilized.

In the outer wall of the cam chain chamber 58, the advance path 100 and the retard path 105 extend from the outer wall of the cylinder 25 toward the outer wall of the cylinder head 26 in parallel with the cylinder axis. In this case, the advance path 100 is positioned on the front side and the retard path 105 is positioned on the rear side, and the retard path 105 extends to a position higher than the advance path 100. Between the outer wall and the inner wall of the cam chain chamber 58, the advance path 100 and the retard path 105 pass through the pair of oil pipes 64 and 65 and extend in a direction orthogonal to the cylinder axis. Accordingly, the pair of oil pipes 64 and 65 form crossing locations of the advance path 100 and the retard path 105.

In the inner wall of the cam chain chamber 58, the advance path 100 and the retard path 105 extend from the outer wall of the cylinder head 26 toward the cam housing 91 in parallel with the cylinder axis. The advance path 100 passes through the lower housing 93 and extends to a mating surface 151 between the lower housing 93 and the upper housing 92, and then passes through the mating surface 151, and is connected to an advance groove 131 laterally. The retard path 105 passes through a mating surface 152 between the cylinder head 26 and the lower housing 93 and extends below a retard groove 132, and then passes through the lower housing 93, and is connected to the retard groove 132 from below. The advance groove 131 and the retard groove 132 are connected to the variable valve device 60 through the intake side camshaft 72.

The advance path 100 and the retard path 105 are formed in the cylinder 25 and the cylinder head 26 by a straight path parallel to the cylinder axis and an orthogonal path orthogonal to the straight path. Therefore, the pressure loss of the oil in the advance path 100 and the retard path 105 is reduced, and the advance path 100 and the retard path 105 can be easily processed with respect to the cylinder 25 and the cylinder head 26. In the cylinder 25 and the cylinder head 26, the advance path 100 and the retard path 105 are arranged in parallel. Therefore, the advance path 100 and the retard path 105 are brought closer in a front-rear direction, and an increase in the size of the engine 21 is suppressed.

A drain hole 109 (see, in particular, FIG. 9) communicating with the drain port 54 (see FIG. 4B) of the oil control valve 40 is formed on the cylinder 25 side of the outer wall of the cam chain chamber 58. An inner peripheral surface of the cam chain 59 is positioned below the drain hole 109, and the oil is discharged from the drain hole 109 toward the cam chain 59. The oil dropped from the drain hole 109 is supplied to the cam chain 59, and a meshing location between the cam chain 59 and the intake side cam sprocket 71 and a meshing location between the cam chain 59 and the exhaust side cam sprocket 81 are properly lubricated, and durability of the cam chain 59 is improved. No guide or complicated processing for directing the oil to the cam chain 59 is required.

Figure 6:
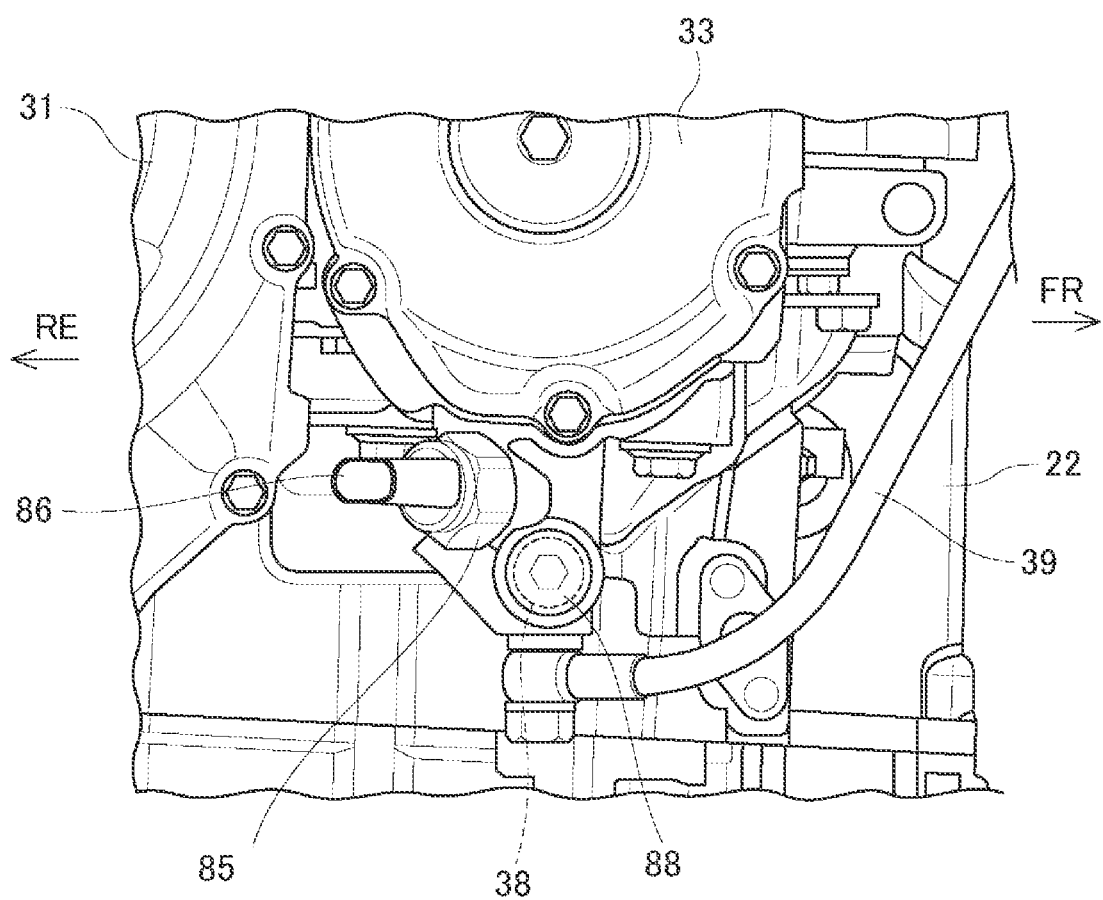
FIG. 6 is a side view of disposing positions of an external pipe and a hydraulic pressure sensor according to the present embodiment.
Figure 7:
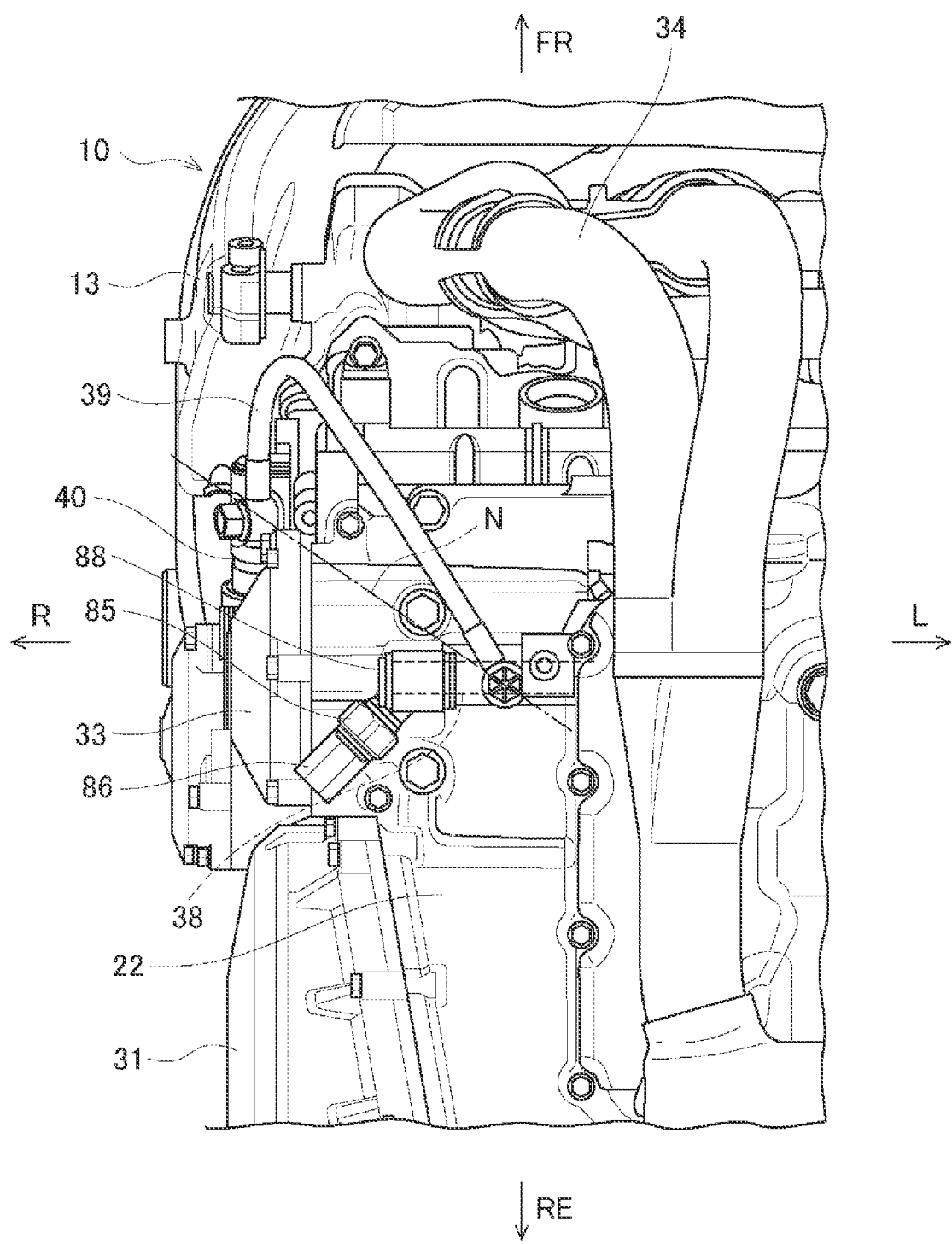
FIG. 7 is a bottom view of the disposing positions of the external pipe and the hydraulic pressure sensor according to the present embodiment.
Figure 8:
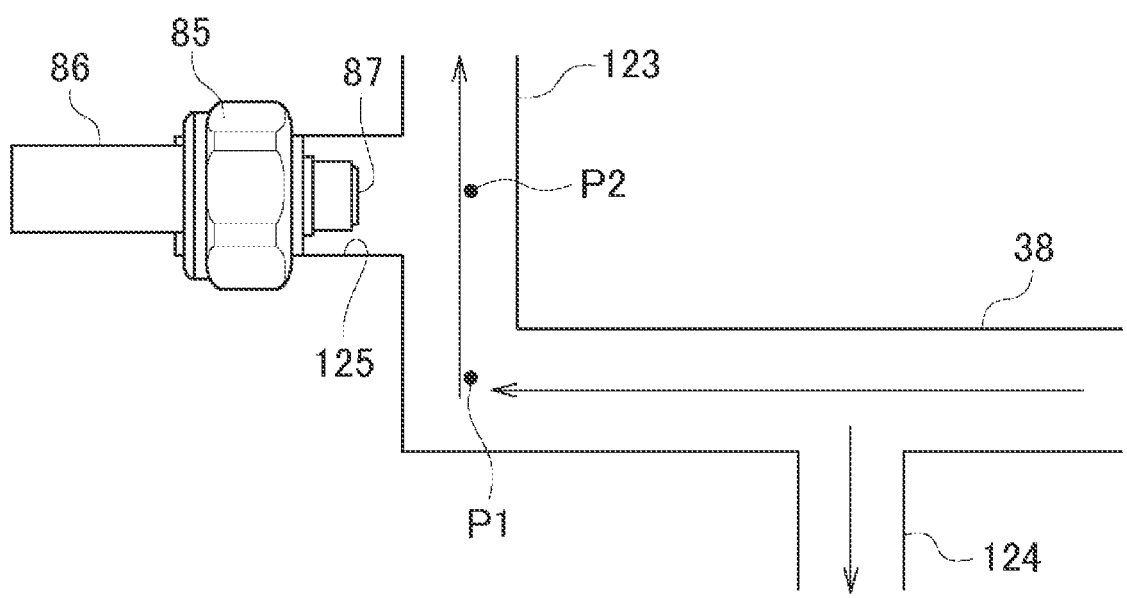
FIG. 8 is a schematic view of an oil path inside a crankcase according to the present embodiment.

Disposing structures of the external pipe and the hydraulic pressure sensor will be described with reference to FIG. 6 to FIG. 8. FIG. 6 is a side view of the disposing positions of the external pipe and the hydraulic pressure sensor according to the present embodiment. FIG. 7 is a bottom view of the disposing positions of the external pipe and the hydraulic pressure sensor according to the present embodiment. FIG. 8 is a schematic view of the oil path inside the crankcase according to the present embodiment.

As shown in FIG. 6 and FIG. 7, the starter gear cover 33 bulges outward in the vehicle width direction from a side surface of the crankcase 22, and a dead space on a lower side of the starter gear cover 33 is used as a disposing space for the hydraulic pressure sensor 85 and the external pipe 39. A plug cap 88 that closes one end portion of the main gallery 38 is disposed on a lower portion of the starter gear cover 33. The one end portion of the external pipe 39 is connected to the main gallery 38 from the lower side inside the plug cap 88 in the vehicle width direction on a right side of the engine (one side in the vehicle width direction) where the oil control valve 40 is disposed.

A branch path 123 (see FIG. 8) extends upwardly from the one end portion of the main gallery 38, and the branch path 123 is oriented to the journal bearing of the crankshaft. The hydraulic pressure sensor 85 detects a hydraulic pressure in the branch path 123 on an upper side of the plug cap 88. In this way, in the side view of the vehicle, the hydraulic pressure sensor 85 is positioned above the main gallery 38 and the one end portion of the external pipe 39 is positioned below the main gallery 38. When the hydraulic pressure sensor 85 and the one end portion of the external pipe 39 are disposed in the up-down direction with the main gallery 38 interposed therebetween, it is easy to secure the bank angle and the like as compared with a case where the hydraulic pressure sensor 85 and the one end portion of the external pipe 39 are arranged in the vehicle width direction.

As shown in FIG. 7, in the bottom view of the vehicle, the one end portion of the external pipe 39 overlaps with the crankcase 22, and the hydraulic pressure sensor 85 overlaps with the crankcase 22 on a right side (one side in the vehicle width direction) of the one end portion of the external pipe 39. An amount of protrusion of the external pipe 39 to the outside in the vehicle width direction is reduced, and most of the hydraulic pressure sensor 85 is accommodated inside the crankcase 22 in the vehicle width direction, which makes it easier to correspond to the bank angle and the like, and suppresses damage when the vehicle overturns. Since the hydraulic pressure sensor 85 is disposed close to a right side of the crankcase 22, heat damage to the hydraulic pressure sensor 85 caused by the engine 21 is suppressed, and the hydraulic pressure sensor 85 can be easily attached and detached, and the maintainability is improved.

In the bottom view of the vehicle, the external pipe 39 extends from the main gallery 38 to the vehicle front side, and a connector 86 of the hydraulic pressure sensor 85 is oriented to the vehicle rear side. The external pipe 39 extends obliquely forward so as to be oriented outward in the vehicle width direction, and the hydraulic pressure sensor 85 includes the connector 86 oriented to an obliquely rearward direction facing the outside in the vehicle width direction. Also when a wiring (not shown) is connected to the connector 86 of the hydraulic pressure sensor 85, an extension direction of the wiring of the hydraulic pressure sensor 85 and an extension direction of the external pipe 39 are opposite to each other. Therefore, a hydraulic pressure of the external pipe 39 can be accurately detected by bringing the hydraulic pressure sensor 85 close to the one end portion of the external pipe 39 without interference between the wiring of the hydraulic pressure sensor 85 and the external pipe 39.

As described above, the one end portion of the external pipe 39 is connected to the main gallery 38 and the other end portion of the external pipe 39 is connected to the oil control valve 40. In the bottom view of the vehicle, the hydraulic pressure sensor 85 is positioned between the one end portion and the other end portion of the external pipe 39 in the vehicle width direction, and thus, the hydraulic pressure sensor 85 does not largely protrude outward from the crankcase 22 in the vehicle width direction. Since the hydraulic pressure sensor 85 is positioned on the vehicle rear side relative to a straight line N connecting the one end portion and the other end portion of the external pipe 39 in the front-rear direction, the disposing space for the hydraulic pressure sensor 85 and the external pipe 39 is divided into front and rear parts of the vehicle, and a degree of freedom in disposing the hydraulic pressure sensor 85 and the external pipe 39 is improved, which makes it easier to correspond to the bank angle and the like.

As shown in FIG. 8, the branch path 123 extends upward from the one end portion of the main gallery 38, and a branch path 124 extends downward from a position upstream of the one end portion of the main gallery 38. The branch path 123 on an upper side is oriented to the journal bearing and the branch path 124 on a lower side is oriented to the external pipe 39. The hydraulic pressure sensor 85 is disposed in the crankcase 22 such that a detection surface 87 of the hydraulic pressure sensor 85 is exposed in the branch path 123. A recess 125 is formed in a wall surface of the branch path 123, and the detection surface 87 of the hydraulic pressure sensor 85 is positioned within the recess 125. In this way, the hydraulic pressure sensor 85 detects a hydraulic pressure near the one end portion of the main gallery 38.

The detection surface 87 of the hydraulic pressure sensor 85 is oriented in a direction perpendicular to the branch path 123 at a position P2 away from an intersection position P1 of the main gallery 38 and the branch path 123. The oil flows from the main gallery 38 toward the branch paths 123 and 124, but a direction of the oil flow in the branch path 123 and a direction of the detection surface 87 of the hydraulic pressure sensor 85 are orthogonal to each other, and thus, the contamination in the oil is less likely to adhere to the detection surface 87 of the hydraulic pressure sensor 85. Since the connector 86 is oriented outward in the vehicle width direction, the hydraulic pressure sensor 85 can be easily removed from the crankcase 22, and the contamination can be periodically removed from the detection surface 87 of the hydraulic pressure sensor 85.

Figure 9:
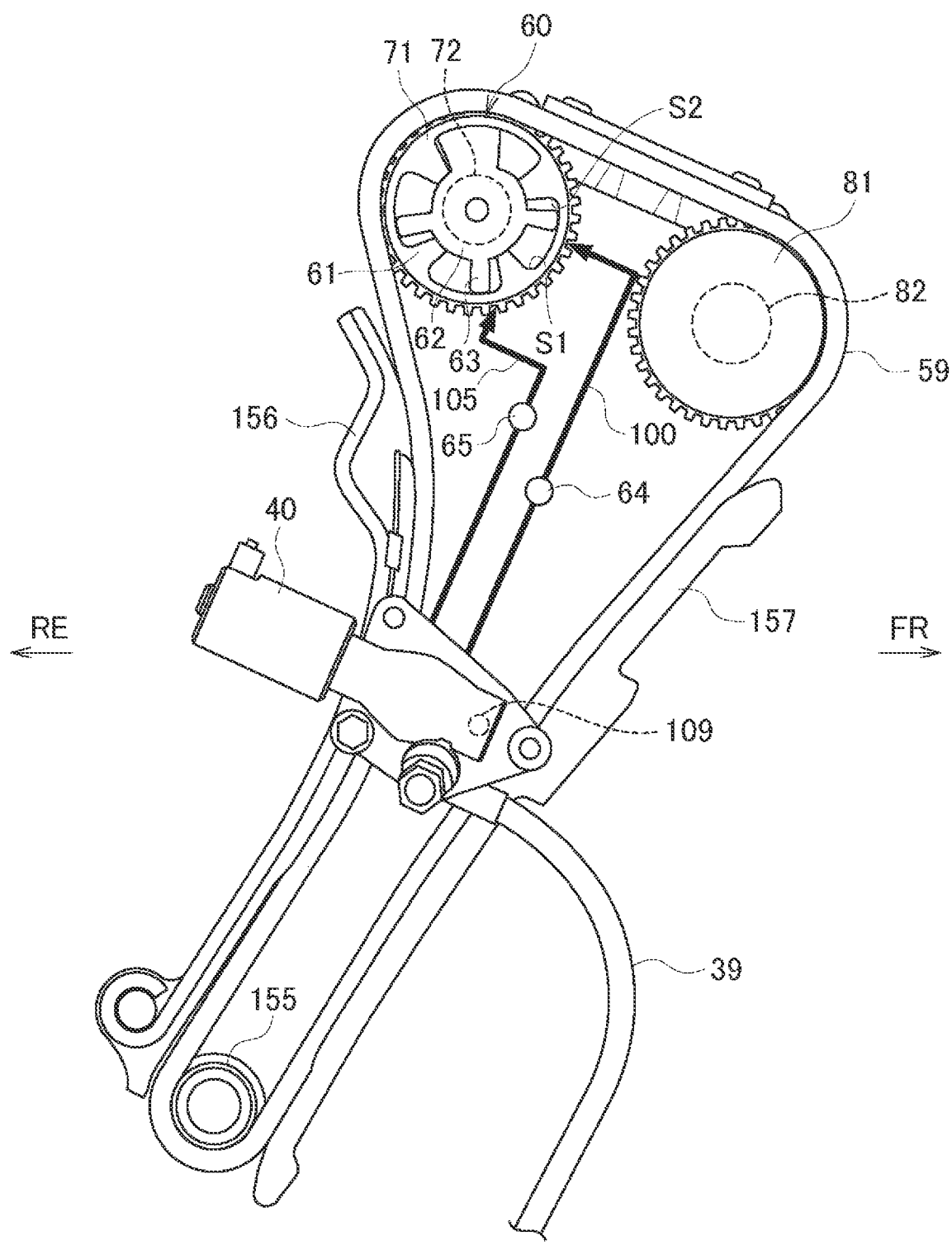
FIG. 9 is a schematic view of a variable valve timing system according to the present embodiment.

The variable valve timing system will be described with reference to FIG. 9. FIG. 9 is a schematic view of the variable valve timing system according to the present embodiment.

As shown in FIG. 9, a drive gear 155 of the cam chain 59 is provided below the oil control valve 40. The crankshaft (not shown) is connected to the drive gear 155 via a gear train. A lower portion of the cam chain 59 is wound around the drive gear 155, and an upper portion of the cam chain 59 is wound around the intake side cam sprocket 71 and the exhaust side cam sprocket 81. As the drive gear 155 rotates and the cam chain 59 rotates in a circle, the intake side camshaft 72 rotates integrally with the intake side cam sprocket 71, and the exhaust side camshaft 82 is rotated integrally with the exhaust side cam sprocket 81.

The cam chain 59 is guided by a lever guide 156 and a chain guide 157. The cam chain 59 sent from the drive gear 155 to the intake side cam sprocket 71 is guided by the lever guide 156, and the cam chain 59 drawn to the drive gear 155 from the exhaust side cam sprocket 81 is guided by the chain guide 157. The cam chain 59 extending from the drive gear 155 to the intake side cam sprocket 71 becomes loose, and thus a chain tensioner (not shown) presses the lever guide 156 against the cam chain 59 to give tension to the cam chain 59.

The intake valve and an exhaust valve are opened and closed by the rotation of the intake side camshaft 72 and the exhaust side camshaft 82, and the opening and closing timing of the intake valve is changed by the variable valve timing system. The variable valve timing system is provided with the variable valve device 60 which changes a relative rotational phase of the intake side camshaft 72 with respect to the crankshaft. The variable valve device 60 includes a case 61 fixed to the intake side cam sprocket 71 and an inner rotor 62 fixed to the intake side camshaft 72. The inner rotor 62 is accommodated inside the case 61 in a relatively rotatable manner.

A plurality of hydraulic pressure chambers are formed in the case 61 of the variable valve device 60, and a plurality of vanes 63 extend radially outward from the inner rotor 62. The vane 63 of the inner rotor 62 is accommodated in each of the hydraulic pressure chambers of the case 61, and each of the hydraulic pressure chambers is partitioned by the vane 63 into the advance chamber S1 and the retard chamber S2. When a volume of the advance chamber S1 is increased according to the hydraulic pressure, the inner rotor 62 is rotated to an advance side relative to the case 61, and the intake side camshaft 72 is advanced. When a volume of the retard chamber S2 is increased according to the hydraulic pressure, the inner rotor 62 is rotated to a retard side relative to the case 61, and the intake side camshaft 72 is retarded.

The variable valve device 60 is operated according to the hydraulic pressure from the oil control valve 40. The oil is supplied to the oil control valve 40 from the main gallery 38 (see FIG. 2) through the external pipe 39. According to a communication state between the ports of the oil control valve 40, an oil supply destination from the oil control valve 40 is switched between the advance chamber S1 and the retard chamber S2 of the variable valve device 60. The oil is supplied from the oil control valve 40 through the advance path 100 to the advance chamber S1, and the oil is supplied from the oil control valve 40 through the retard path 105 to the retard chamber S2.

As described above, the advance path 100 and the retard path 105 cross the cam chain chamber 58 (see FIG. 6), and the oil pipes 64 and 65 are used to cross the cam chain chamber 58. The oil pipes 64 and 65 are disposed inside the cam chain 59 between the lever guide 156 and the chain guide 157. The oil pipes 64 and 65 are arranged in the front-rear direction while being separated from each other in the up-down direction, and the disposing area of the oil pipes 64 and 65 is narrowed, and the oil pipes 64 and 65 are disposed inside the cam chain 59 with ample space. Even when the cam chain 59 is pushed by the lever guide 156, the cam chain 59 does not interfere with the oil pipes 64 and 65.

According to the present embodiment, the oil with high hydraulic pressure is supplied directly from the main gallery 38 to the oil control valve 40 through the external pipe 39, and a hydraulic pressure near the external pipe 39 is detected by the hydraulic pressure sensor 85, so that the operation accuracy of the variable valve device 60 can be improved. In the bottom view of the vehicle, the one end portion of the external pipe 39 and the hydraulic pressure sensor 85 overlap with the crankcase 22, so that the external pipe 39 and the hydraulic pressure sensor 85 can be disposed at proper positions with consideration for the bank angle and damage at the time of overturning, and the like. By bringing the hydraulic pressure sensor 85 close to the right side, the heat damage to the hydraulic pressure sensor 85 caused by the engine 21 can be suppressed, access to the hydraulic pressure sensor 85 is facilitated, and the maintainability is improved.

In the present embodiment, a direction of the detection surface of the hydraulic pressure sensor and a direction of the oil flow in the branch path are orthogonal to each other to suppress the contamination from adhering to the detection surface of the hydraulic pressure sensor, but it is difficult to sufficiently suppress the contamination from adhering to the detection surface of the hydraulic pressure sensor. When the contamination adheres to the detection surface of the hydraulic pressure sensor, the detection accuracy of the hydraulic pressure sensor may be reduced. Therefore, as shown in a modification of FIG. 10A, a hydraulic pressure sensor 161 with a mesh strainer 166 may be used.

Figure 10A:
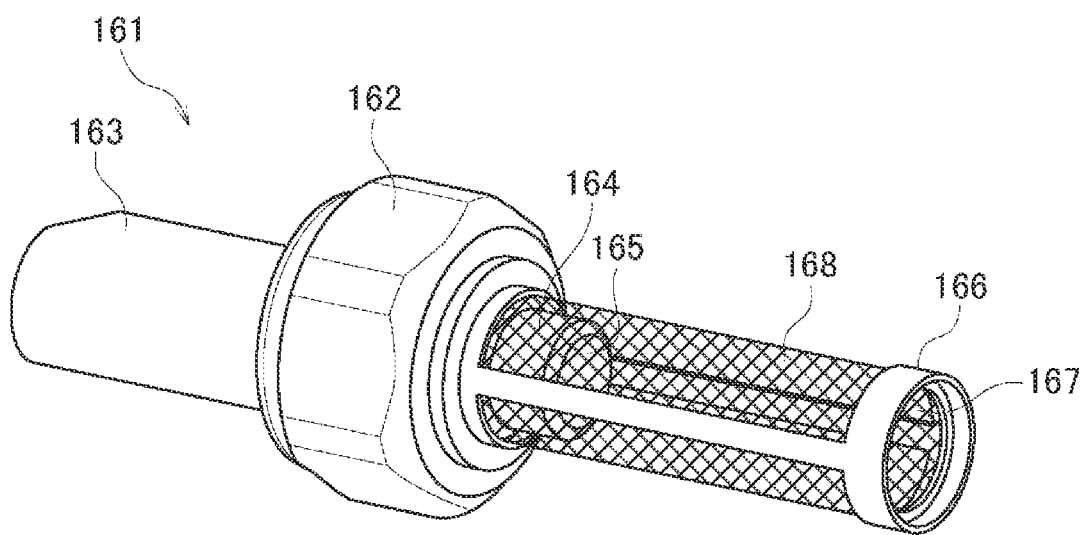
FIG. 10A and FIG. 10B each is a perspective view of a hydraulic pressure sensor according to a modification.

As shown in FIG. 10A, the hydraulic pressure sensor 161 includes a sensor main body 162 having a hexagonal head shape that is gripped by a tool or the like, a connector 163 provided on one end side of the sensor main body 162, and a detection portion 164 protruding from the other end side of the sensor main body 162. The cylindrical strainer 166 is attached to the other end side of the sensor main body 162 so as to surround the detection portion 164. A coarse mesh 167 is formed on a tip end surface of the strainer 166, and a mesh 168 that is finer than the mesh 167 formed on the tip end surface is formed on an outer peripheral surface of the strainer 166. Such a hydraulic pressure sensor 161 is preferably used in an oil path branched in a T-shape in the crankcase 22.

Figure 11:
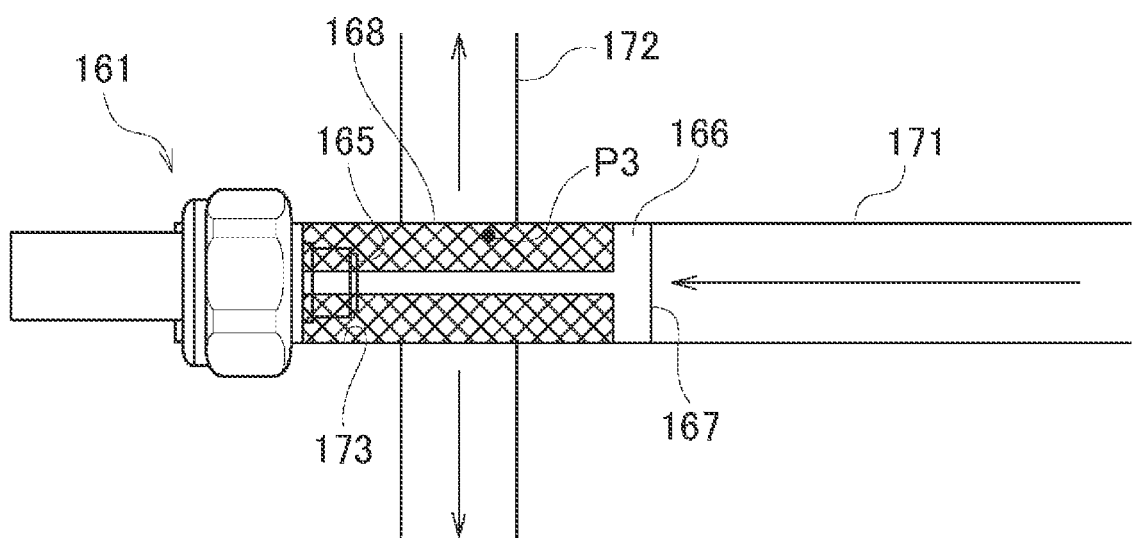
FIG. 11 is a schematic view of an oil path inside a crankcase according to the modification.

As shown in FIG. 11, a branch path 172 extends in the up-down direction from one end portion of a main gallery 171. An upper side of the branch path 172 is oriented to the journal bearing and a lower side of the branch path 172 is oriented to the external pipe 39. A recess 173 is formed in an outer peripheral surface of the branch path 172 so as to face the main gallery 171 at an intersection position P3 of the main gallery 171 and the branch path 172. A detection surface 165 of the hydraulic pressure sensor 161 is positioned within the recess 173, and the detection surface 165 of the hydraulic pressure sensor 161 is oriented to the main gallery 171. The hydraulic pressure sensor 161 is provided with the strainer 166 that crosses the branch path 172 and enters the main gallery 171.

The oil in the main gallery 171 is filtered by the strainer 166 to suppress the contamination from adhering to the detection surface 165 of the hydraulic pressure sensor 161, and the oil in the branch path 172 is filtered to suppress the contamination from entering the journal bearing. In this case, the mesh 167 on the tip end surface of the strainer 166 disposed in the main gallery 171 is formed coarser than the mesh 168 on the outer peripheral surface of the strainer 166 disposed in the branch path 172. The oil is filtered by the meshes 167 and 168 in a stepwise manner while the oil flows from the main gallery 171 to the branch path 172. Therefore, the contamination is effectively removed from the oil while a pressure loss in the path is reduced.

Figure 10B:
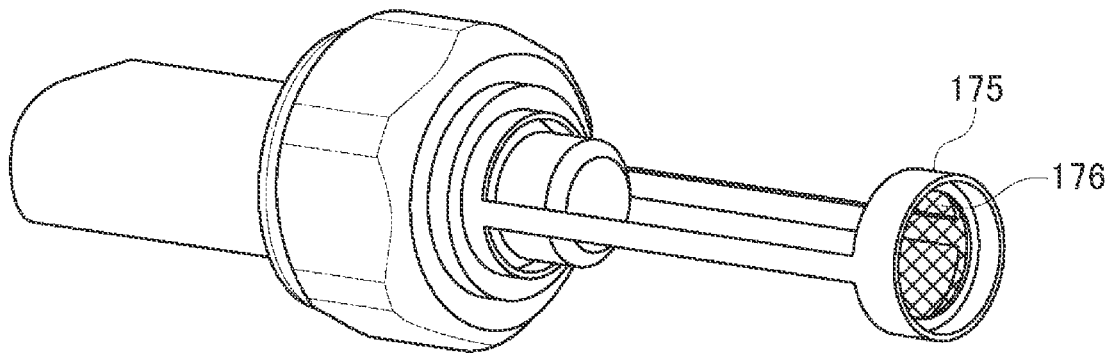

As shown in FIG. 10B, a mesh 176 may be formed only on a tip end surface of a strainer 175. In this case, the mesh 176 is formed on the tip end surface of the strainer 175 disposed in the main gallery 171, and an outer peripheral surface of the strainer 175 disposed in the branch path 172 is opened. With such a configuration, the contamination can be removed from the oil in the main gallery 171 while a pressure loss in the path can be reduced.

In the present embodiment, the hydraulic pressure sensor is not provided with a strainer, but the hydraulic pressure sensor may be provided with a strainer. In this case, the detection surface of the hydraulic pressure sensor is positioned within a recess of a branch path, and the strainer is provided on the hydraulic pressure sensor so as to protrude from the recess into the branch path. Accordingly, the oil in the branch path is filtered by the strainer to suppress the contamination from adhering to the detection surface of the hydraulic pressure sensor and suppress the contamination from entering the journal bearing.

In the present embodiment, the parallel 4-cylinder engine is exemplified as the engine, but the type of the engine is not particularly limited.

In the present embodiment, a twin spar frame is exemplified as the vehicle body frame, but the type of vehicle body frame is not particularly limited as long as the vehicle body frame can suspend the cylinder head. For example, the vehicle body frame may be a cradle frame or a diamond frame.

In the present embodiment, the oil control valve is disposed on a right side surface of the engine, but the oil control valve may be disposed on a left side surface of the engine.

In the present embodiment, the oil control valve is disposed on the outer surface of the cylinder, but the oil control valve may be disposed on the outer surface of the engine. For example, the oil control valve may be disposed on an outer surface of the crankcase.

In the present embodiment, the solenoid valve is used as an example of the oil control valve, but the type of the oil control valve is not particularly limited as long as the oil control valve is a valve that can control the hydraulic pressure for the variable valve device.

In the present embodiment, the intake side camshaft is provided with the variable valve device, but at least one of the intake side camshaft and the exhaust side camshaft may be provided with the variable valve device.

In the present embodiment, the detachable oil pipe forms a crossing path in the cam chain chamber, but the crossing path in the cam chain chamber may be formed so as to allow the oil to move between the inner wall and the outer wall of the cam chain chamber. For example, one of the inner wall and the outer wall of the cylinder head may protrude toward the other to form the crossing path.

In the present embodiment, the advance path and the retard path are partially formed in parallel, but the advance path and the retard path may be formed entirely non-parallel when the size of the engine is large enough.

In the present embodiment, the oil control valve is disposed so as not to overlap with the bolt on the outer surface of the cylinder, but the oil control valve may overlap with the bolt when the oil control valve does not protrude excessively from the outer surface of the engine.

In the present embodiment, the oil pipe and the plug cap are formed separately, but the oil pipe and the plug cap may be formed integrally.

In the present embodiment, an area surrounded by the main frame, the down frame, and the lower surface of the cylinder head is formed in a triangle shape, but the shape of the area surrounded by the main frame, the down frame, and the lower surface of the cylinder head is not particularly limited.

In the present embodiment, the external pipe extends from the main gallery to the vehicle front side and the connector of the hydraulic pressure sensor is oriented to the vehicle rear side, but the connector of the hydraulic pressure sensor may be oriented in the extension direction of the external pipe as long as the external pipe and the wiring of the hydraulic pressure sensor do not interfere with each other.

In the present embodiment, the one end portion of the external pipe is covered with the exhaust pipe from the front in the front view of the vehicle, but the one end portion of the external pipe may be exposed from the exhaust pipe in the front view of the vehicle.

The variable valve timing system may be applied not only to the shown straddle-type vehicle, but also to other types of straddle-type vehicles. The straddle-type vehicle is not limited to general vehicles on which a rider rides in a posture of straddling a seat, and also includes a small-sized scooter-type vehicle on which a rider rides without straddling a seat.

As described above, the variable valve timing system according to the present embodiment is a variable valve timing system for an engine (21) in which a main gallery (38) extending in a vehicle width direction is formed at a crankcase (22), the variable valve timing system including: a variable valve device (60) configured to change an opening and closing timing of a valve according to a hydraulic pressure; an oil control valve (40) configured to control a hydraulic pressure with respect to the variable valve device; an external pipe (39) connecting the main gallery and the oil control valve; and a hydraulic pressure sensor (85) configured to detect a hydraulic pressure in an oil path formed at the crankcase. The oil control valve is disposed on one side surface of the engine in the vehicle width direction. One end portion of the external pipe is connected to one side of the main gallery in the vehicle width direction. In a bottom view of a vehicle, the one end portion of the external pipe overlaps with the crankcase, and the hydraulic pressure sensor overlaps with the crankcase on one side of the one end portion of the external pipe in the vehicle width direction. According to the configuration, oil with high hydraulic pressure is supplied directly from the main gallery to the oil control valve through the external pipe, and a hydraulic pressure near the external pipe is detected by the hydraulic pressure sensor, so that an operation accuracy of the variable valve device can be improved. In the bottom view of the vehicle, the one end portion of the external pipe and the hydraulic pressure sensor overlap with the crankcase, so that the external pipe and the hydraulic pressure sensor can be disposed at proper positions with consideration for a bank angle and damage at the time of overturning, and the like. By bringing the hydraulic pressure sensor close to one side in the vehicle width direction, heat damage to the hydraulic pressure sensor caused by the engine can be suppressed, access to the hydraulic pressure sensor is facilitated, and maintainability is improved.

In the variable valve timing system according to the present embodiment, in the bottom view of the vehicle, the external pipe extends from the main gallery to a vehicle front side, and a connector (86) of the hydraulic pressure sensor faces toward a vehicle rear side. According to the configuration, even if a wiring is connected to the connector of the hydraulic pressure sensor, an extension direction of the wiring of the hydraulic pressure sensor and an extension direction of the external pipe are opposite to each other. Therefore, a hydraulic pressure of the external pipe can be accurately detected by bringing the hydraulic pressure sensor close to the one end portion of the external pipe without interference between the wiring of the hydraulic pressure sensor and the external pipe. A disposing space for the hydraulic pressure sensor and the external pipe is divided into front and rear parts of the vehicle, and a degree of freedom in disposing the hydraulic pressure sensor and the external pipe is improved, which makes it easier to correspond to the bank angle and the like.

In the variable valve timing system according to the present embodiment, the other end portion of the external pipe is connected to the oil control valve, and in the bottom view of the vehicle, the hydraulic pressure sensor is positioned between the one end portion and the other end portion of the external pipe in the vehicle width direction, and is positioned closer to a vehicle rear side than a straight line connecting the one end portion and the other end portion of the external pipe in a front-rear direction. According to the configuration, the hydraulic pressure sensor does not largely protrude from the crankcase in the vehicle width direction. The disposing space for the hydraulic pressure sensor and the external pipe is divided into the front and rear parts of the vehicle, and the degree of freedom in disposing the hydraulic pressure sensor and the external pipe is improved, which makes it easier to correspond to the bank angle and the like.

In the variable valve timing system according to the present embodiment, in a side view of the vehicle, the hydraulic pressure sensor is positioned above the main gallery and the one end portion of the external pipe is positioned below the main gallery. According to the configuration, since the hydraulic pressure sensor and the one end portion of the external pipe are disposed in an up-down direction with the main gallery interposed therebetween, it is easy to secure the bank angle and the like as compared with a case where the hydraulic pressure sensor and the one end portion of the external pipe are arranged in the vehicle width direction.

In the variable valve timing system according to the present embodiment, an engine cover (clutch cover 31, starter gear covers 32 and 33) is attached to one side surface of the crankcase in the vehicle width direction, an exhaust pipe (34) extends downward from a front surface of a cylinder head above the crankcase, and in a front view of the vehicle, the one end portion of the external pipe is covered with the exhaust pipe from a front, the external pipe protrudes from a back side of the exhaust pipe to the one side in the vehicle width direction, and passes between the exhaust pipe and the engine cover toward the oil control valve. According to the configuration, the one end portion of the external pipe near a road surface is protected by the exhaust pipe. Further, the external pipe is separated from the exhaust pipe without protruding to the one side in the vehicle width direction from the engine cover. Since an influence of a heat from the exhaust pipe on the external pipe is suppressed and the external pipe is cooled by running wind, an increase in an oil temperature inside the external pipe can be suppressed.

In the variable valve timing system according to the present embodiment, a cylinder (25) is fixed on the crankcase, a cylinder head (26) is fixed on the cylinder, and the cylinder head is suspended on a vehicle body frame (10), the vehicle body frame includes a main frame (12) configured to laterally cover a rear side of the cylinder head and a down frame (13) configured to laterally cover a front side of the cylinder head, and the oil control valve is disposed on a side surface of the cylinder, and the external pipe is disposed below the down frame. According to the configuration, the external pipe extends from the main gallery of the crankcase to the oil control valve on the side surface of the cylinder on the one side in the vehicle width direction. The external pipe is shortened, a pressure loss is reduced, and the operation accuracy of the variable valve device can be improved. Since the external pipe is shortened, it is easy to correspond to a bank angle and the like.

Although the present embodiment has been described, a part or all of the above-described embodiment and modification may be combined as another embodiment.

The technique of the present invention is not limited to the above-described embodiment, and various changes, substitutions, and modifications may be made without departing from the spirit of the technical concept. The present invention may be implemented by other methods as long as the technical concept can be implemented by the methods through advance of the technique or other derivative techniques. Therefore, the claims cover all embodiments that may be included within the scope of the technical concept.

What is claimed is:

1. A variable valve timing system for an engine in which a main gallery extending in a width direction of a vehicle is formed at a crankcase, the variable valve timing system comprising:
   a hydraulic variable valve device configured to change an opening and closing timing of a gas exchange valve;
   an oil control valve configured to control hydraulic pressure supplied to the variable valve device;
   an external pipe connecting the main gallery to the oil control valve; and
   a hydraulic pressure sensor configured to detect hydraulic pressure in an oil path formed at the crankcase, wherein:
   the oil control valve is disposed on a side surface of the engine in the width direction of the vehicle,
   a first end portion of the external pipe is connected to an end of the main gallery in the width direction of the vehicle, and
   in a bottom view of the vehicle, the first end portion of the external pipe overlaps with the crankcase, and the hydraulic pressure sensor overlaps with the crankcase adjacent to the first end portion of the external pipe in the width direction of the vehicle.

2. The variable valve timing system according to claim 1, wherein:
   in the bottom view of the vehicle, the external pipe extends from the main gallery to a front side of the vehicle, and a connector of the hydraulic pressure sensor extends toward a rear side of the vehicle.

3. The variable valve timing system according to claim 1, wherein:
   a second end portion of the external pipe is connected to the oil control valve, and
   in the bottom view of the vehicle, the hydraulic pressure sensor is positioned: (i) between the first end portion and the second end portion of the external pipe in the width direction of the vehicle, and (ii) closer to a rear side of the vehicle than the first end portion and the second end portion of the external pipe in a front-rear direction of the vehicle.

4. The variable valve timing system according to claim 1, wherein:
   in a side view of the vehicle, the hydraulic pressure sensor is positioned above the main gallery, and the first end portion of the external pipe is positioned below the main gallery.

5. The variable valve timing system according to claim 1, wherein
   an engine cover is attached to a side surface of the crankcase in the width direction of the vehicle,
   an exhaust pipe extends downward from a front surface of a cylinder head above the crankcase, and
   in a front view of the vehicle, the exhaust pipe covers the first end portion of the external pipe such that a remaining portion of the external pipe: (i) protrudes from a back side of the exhaust pipe to the side surface of the crankcase in the width direction of the vehicle, and (ii) passes between the exhaust pipe and the engine cover toward the oil control valve.

6. The variable valve timing system according to claim 1, wherein:
   a cylinder is fixed on the crankcase, a cylinder head is fixed on the cylinder, and the cylinder head is suspended on a body frame of the vehicle,
   the body frame includes a main frame configured to laterally cover a rear side of the cylinder head and a down frame configured to laterally cover a front side of the cylinder head, and
   the oil control valve is disposed on a side surface of the cylinder, and the external pipe is disposed below the down frame.

* * * * *